United States Patent [19]  [11] Patent Number: 4,958,786
Ogawa et al.  [45] Date of Patent: Sep. 25, 1990

[54] ACTIVE CONTROL MECHANISM FOR A HELICOPTER

[75] Inventors: Koji Ogawa, Ashiya; Hikoichi Machida, Toyonaka, both of Japan

[73] Assignee: Sumitomo Precision Products Co., Ltd., Amagasaki, Japan

[21] Appl. No.: 423,695

[22] Filed: Oct. 18, 1989

Related U.S. Application Data

[63] Continuation of Ser. No. 148,872, Jan. 27, 1988, abandoned.

[30] Foreign Application Priority Data

Feb. 3, 1987 [JP]  Japan ................................. 62-22784
Feb. 3, 1987 [JP]  Japan ................................. 62-22785

[51] Int. Cl.$^5$ .............................................. B64C 11/34
[52] U.S. Cl. .................................. 244/17.13; 416/114
[58] Field of Search ............... 244/17.13; 416/31, 35, 416/36, 114

[56] References Cited

U.S. PATENT DOCUMENTS

| | | | |
|---|---|---|---|
| 3,010,679 | 11/1961 | Kelley | 244/17.13 |
| 3,050,276 | 8/1962 | Wissinger | 244/17.13 X |
| 3,429,376 | 2/1969 | Hohenemser | 244/17.13 X |
| 3,520,498 | 7/1970 | Murphy | 416/31 |
| 4,834,318 | 5/1989 | Taylor et al. | 244/17.13 |

Primary Examiner—Sherman Basinger
Attorney, Agent, or Firm—Watson, Cole, Grindle & Watson

[57] ABSTRACT

The rotor damping and control power value can be made arbitrary by controlling a cyclic pitch control mechanism with a signal proportional to the angular acceleration of the attitude angle $\theta$, a signal proportional to the angular velocity of the attitude angle $\theta$, and a correction signal based upon the difference between the attitude angle $\theta$ and assumed attitude angle $\theta_0$, plus the cyclic pitch control input $\Psi$ applied to a cyclic pitch lever of a pilot. Thus, the rotor damping and control power are brought to their optimum values in response to the actual flight conditions of a helicopter for ideal operability, resulting in both high stability and operability, and, for example, fully automatically controlled hovering can be accomplished without producing any vibration in the attitude angle control response.

6 Claims, 4 Drawing Sheets

ACTIVE CONTROL MECHANISM FOR A HELICOPTER

This application is a continuation of application Ser. No. 148,872, filed Jan. 27, 1988, now abandoned.

BACKGROUND OF THE INVENTION

1. Field of the Invention

The present invention relates to an active control of a helicopter for the enhancement of stability, improvement of operation characteristics, reduction of vibration and an automatic control of hovering.

More particularly, the invention relates to an active control mechanism of the helicopter which is capable of changing the rotor damping and/or control power of the helicopter into the optimum values corresponding to the desired flight conditions, satisfying the contradictory characteristics of stability and quick mobility, and further, operating automatically at hovering and so on.

2. Description of the Prior Art

The operation control mechanism of a helicopter is basically unchanged since its invention, and the rotation of the rotor which is a matter of course is dominant in every respect.

That is to say, many benefits have occurred from its high degree of freedom in flight characteristics, while various problems have arisen in its dynamic instability and flight characteristics at hovering and low speed cruising due to the lack of means to maintain self-stability.

Also, the operability of the helicopter is said to be determined by the factors of control power and rotor damping, values which could be never improved particularly.

Conventionally, in order to increase the control power, a rigid rotor without a flapping hinge has been proposed, or for increasing the damping power, a so-called stabilizing bar and a servo-control rotor have been devised as disclosed, for example, in U.S. Pat. No. 3,050,276.

However, both techniques are still far from substantially solving such problems.

The helicopter was considered to be inherently unstable, thus forcing an excessive operating load on the pilot. Therefore, ever since the birth of helicopter, mechanical or electrical stabilizing mechanisms have been incorporated.

As a most popular electrical stabilizing mechanism, there is a stability augmentation system (SAS) wherein an actuator is arranged in a cyclic control rod or a main operating system in series, so that by an angular velocity signal of the inclined angle of a fuselage detected with various sensors, damping is given and controlled. Thereby, stability was believed to be enhanced, but the operability, in particular, a high mobility was yet to be satisfied at the same time.

Recently, due to changes in traffic and transporting conditions, the helicopter is required to have a high mobility and responsiveness in addition to a high stability.

Therefore, a control augmentation system (CAS) designed to provide both stability and operability, and a stability and control augmentation system (SCAS) combined with SAS have been developed to exclude the steering signal of the pilot from the SAS output.

Also, a device for obtaining the static stability is proposed to arrange the actuator in the operating system in series and actuate it as a function of the velocity or steering position.

Moreover, as to an attitude control, the difference between assumed and actual attitude angles of the fuselage is normally controlled by the feedback, and tending to be, together with the SAS, etc., integrated in an automatic operating mechanism, a so-called auto-pilot.

For example, U.S. Pat. No. 3,520,498 relates to "the stabilization of aircraft rotor systems having cyclic pitch, and more particularly to the generation of a signal representing rate of the change in the attitude of the rotor shaft relative to a first control axis for introducing cyclic pitch relative to a second control axis".

However, in either a conventional stability or a control augmentation system, the other mechanism is used together on the basis of SAS, resulting in a limited effect and a poor real time response corresponding to the changes of actual flight conditions, therefore the development of a more superior system and an operability which is variable in response to the desired flight conditions have been earnestly desired.

SUMMARY OF THE INVENTION

The present invention is, in view of the present situation aforementioned, directed to improve an active control of a helicopter by enhancement of stability, improvement of operation characteristics, reduction of vibration and an automatic control of hovering.

Moreover, the present invention is directed to an active control mechanism of the helicopter which is capable of changing its rotor damping and/or control power into optimum values in response to the desired flight conditions, satisfying the two contradictory characteristics of stability and quick movement, and operating automatically at hovering and so on.

According to the present invention, as a result of various studies made with respect to a cyclic pitch control mechanism which is able to change the rotor damping and/or control power, for the purpose of stability and control augmentation, and knowing the fact that the rotor damping can be brought to an arbitrary value by controlling with the angular acceleration of the attitude angle of the fuselage at cyclic pitch control, and that the characteristic value of the control power can be also made arbitrary by the cyclic pitch control performed together with the angular velocity of the fuselage attitude angle, the operation performance which satisfies the two contradictory characteristics of stability and quick movability was obtained. The active control mechanism of the helicopter which is capable of operating the hovering automatically was completed.

That is to say, according to the present invention, besides the operation control input $\Psi$ added to the cyclic pitch control mechanism, by adding a signal proportional to the angular acceleration of the attitude angle $\theta$ or by further adding a correction signal proportional to the cyclic pitch control input $\Psi$ to control the cyclic pitch control system, the rotor damping value can be made arbitrary and the operability can be changed arbitrarily.

Also, according to the present invention, besides the operation control input $\Psi$ added to the cyclic pitch control mechanism, by controlling the cyclic pitch control system with a signal proportional to the angular velocity of the attitude angle $\theta$ and a correction signal proportional to the cyclic pitch control input $\Psi$, the control power can be brought to an arbitrary value.

Also, the present invention embodies the active control mechanism of the helicopter characterized in that, besides a cyclic pitch control input $\Psi$ signal of the pilot, by adding a signal proportional to the angular acceleration of the attitude angle $\theta$ of the fuselage and a signal proportional to the angular velocity of the attitude angle $\theta$ of the fuselage, or by further adding a correction signal a (relative to the angular acceleration) proportional to the cyclic pitch control input $\Psi$ and/or a correction signal b (relative to the angular velocity) proportional to the cyclic pitch control input $\Psi$, the actuator of the control mechanism is controlled for the cyclic pitch control.

Thus, according to the present invention, in response to the actual flight conditions of the helicopter, an optimum rotor damping value and/or control power value are determined for the ideal operability, enabling both high stability and good operability at the same time and providing helicopter which responds accurately in real time in response to the changes of actual flight conditions.

Moreover, according to the present invention, by controlling the cyclic pitch control mechanism with a signal proportional to the angular acceleration of the attitude angle $\theta$, a signal proportional to the angular velocity of the attitude angle $\theta$ and a correction signal based upon the difference between the attitude angle $\theta$ and the assumed attitude angle $\theta_0$, the rotor damping value and the control power value can be made arbitrary.

Also, in response to the actual flight conditions of the helicopter, the optimum rotor damping value and control power value are determined for the ideal operability, enabling both high stability and good operability at the same time, for example, controlling the hovering fully automatically without producing any vibration in the attitude control response.

Figure 1:
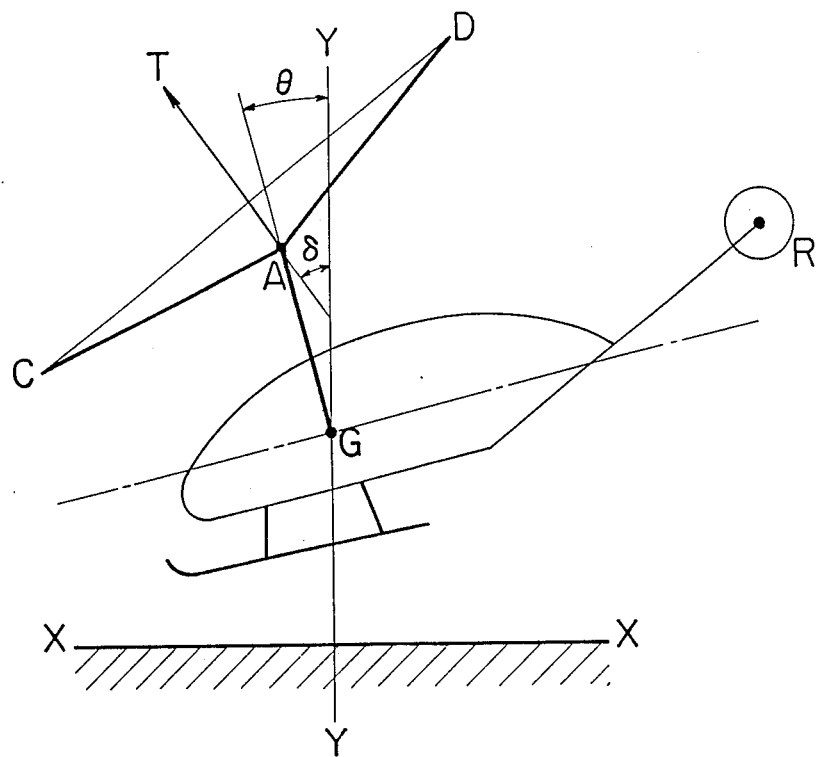
FIG. 1 is an illustrative view showing a flight attitude of a helicopter.

Reference characters in the drawings are as follows; G ... Center of gravity of a helicopter, A ... Center of a rotor boss metal, X—X ... Ground level, Y—Y ... Vertical axis, AG ... Mast axis, R ... Tail rotor. 1 ... Lower swash, 2 ... Rod, 3 ... Actuator, 4 ... Control computer, 5 ... Arithmetic computer.

DETAILED DESCRIPTION OF THE PREFERRED EMBODIMENT OF THE INVENTION

Embodiment 1

A helicopter control comprises a vertical control effected by increasing and decreasing the rotor blade pitch, and a directional control effected by a torque effect resulting from the rotation of a rotor and a thrust of a tail rotor.

Furthermore, horizontal control is effected by inclining the rotor disk (CD) of the main rotor in a desired direction relative to the mast axis (AG).

The magnitude of inclined moment of the fuselage produced against a unit inclined angle of the rotor disk is called control power.

Also, since the rotor disk (CD) is delayed from the mast axis (AG) when the helicopter is inclined at a certain angular velocity, a so-called damping action is produced on the rotor and the magnitude of inclined angle of the rotor disk produced in the case of unit angular velocity is called rotor damping.

In general, the equation specifying the flapping motion of the rotor blade is given as, $$\ddot{\beta} + 1/8\gamma\Omega\dot{\beta} + \Omega^2\beta = \Omega^2\beta_0 \tag{1}$$

where
$\beta$ = Flapping angle of the rotor blade
$\beta_0$ = Conning angle of the rotor blade
$\Omega$ = Angular velocity of the rotor
$\gamma$ = Constant Now, applying an external unit force cos $\Omega t$. Equation (1) gives $$\beta = \beta_0 + (\theta + \Psi)\{1 - e^{-(\gamma\Omega/16)t}\}\sin\Omega t \tag{2}$$

As shown in FIG. 1, when
$\theta$ = Angle between the mast axis (AG) and the vertical axis (YY)
$\Psi$ = Inclined angle of the swash plate against the mast axis (AG),
and angle between the aerodynamic direction-acting vertically on the rotor disk (CD) and the vertical axis (YY) is indicated as $\sigma$, and substituting $\beta$ of Equation (2) by $\sigma$ gives $$\sigma = (\theta + \Psi)\{1 - e^{-(\gamma\Omega/16)t}\} \tag{3}$$

The differential equation specifying $\sigma$ is, $$\dot{\sigma} = T(\theta + \Psi - \sigma) \tag{4}$$

where, $T = \gamma\Omega/16$ or reciprocal number of the rotor damping,
Meanwhile, from the Newton's law, $$\ddot{\theta} = K(\sigma - \theta) \tag{5}$$

Here, K is the control power value divided by the value of moment of inertia around the center of gravity (G) of the fuselage.

When eliminating $\sigma$ from Equations (4) and (5), Equation (6) giving attitude angle $\theta$ response of the fuselage relative to the operating input $\Psi$ of a cyclic pitch control mechanism of the pilot is obtained, $$\dddot{\theta} + T\ddot{\theta} + K\dot{\theta} = KT\Psi \tag{6}$$

Equation (6) shows that the operation performance of the helicopter is determined by the two factors of the rotor damping and control power.

Meanwhile, in addition to the operating input $\Psi$ of the cyclic pitch control mechanism of the pilot, when a input (proportional constant $k_2$) proportional to the angular velocity of the fuselage attitude angle $\theta$, and a input (proportional constant $k_3$) proportional to the angular acceleration of the fuselage attitude angle $\theta$ are input to the cyclic pitch control mechanism, Equation (4) gives $$\dot{\sigma} = T(\theta + \Psi + k_2\dot{\theta} + k_3\ddot{\theta} - \sigma) \tag{7}$$

Now, eliminating $\sigma$ from Equations (7) and (5), Equation (8) is obtained as the equation corresponding to Equation (6), $$\ddot{\theta} + T'\dot{\theta} + K'\theta = KT\Psi \quad (8)$$
$$T' = T(1 - k_3K) \quad (9)$$
$$K' = K(1 - k_2T) \quad (10)$$

Here, $k_2$, $k_3$ should satisfy the following equation, $$(1-k_3K)\times(1-k_2T)=1 \quad (11)$$

In the above detailed analysis, when comparing Equations (6) and (8), the fuselage attitude angle $\theta$ response relative to the operating input $\Psi$ of the cyclic pitch control is, if limited to $\Omega$, naturally the one shown by the fuselage having the rotor damping and control power value of T and K.

However, when $k_2\dot{\theta}$ and $k_3\ddot{\theta}$ are input in addition to $\Psi$, it can be seen that $\theta$ is changed completely and the same response just as the one shown by the fuselage having the rotor damping and control power value of T' and K', which are given by Equations (9) and (10) and different from T and K is exhibited.

In the foregoing, though specific conditions were assumed and for the simplicity, conditional equations specifying $k_2$ and $k_3$ were established, $k_2$ and $k_3$ may be, in effect, given any numerical value independently and the aforementioned result can be obtained at any flight condition.

That is to say, in addition to the operating input $\Psi$ of the cyclic pitch control mechanism of the pilot, when $k_3\ddot{\theta}$ proportional to the angular acceleration of the fuselage attitude angle $\theta$, and correction input $-k_3K\Psi$ proportional to the operating input $\Psi$ are input to the cyclic pitch control mechanism, Equation (4) gives $$\sigma = T(\dot{\theta} + \psi + k_3\ddot{\theta} - k_3K\Psi - \dot{\sigma}) \quad (12)$$

Eliminating $\sigma$ from Equations (12) and (5), Equation (13) is obtained as the equation corresponding to Equation (6), $$\ddot{\theta} + T'\dot{\theta} + K\theta = KT\Psi \quad (13)$$

Here, $T' = T(1-k_3K)$.

As it will be clear, by such an operation, the response of the helicopter is changed completely into the one shown when T is changed into T' (K is invariant).

Meanwhile, similarly, in addition to the operating input $\Psi$ of the cyclic pitch control mechanism of the pilot, when $k_2\dot{\theta}$(proportional to the angular velocity of the fuselage attitude angle)$\theta$ and correcting input $-k_2T\Psi$(proportional to the operating input) $\Psi$ are input to the cyclic pitch control mechanism, Equation (4) gives $$\sigma = K(\dot{\theta} + \psi + k_2\dot{\theta} - k_2T\Psi - \dot{\sigma}) \quad (14)$$

Now, eliminating $\sigma$ from Equations (14) and (5), Equation (15) is obtained as the equation corresponding to Equation (6)

$$\ddot{\theta} + T\dot{\theta} + K'\theta = KT\Psi \quad (15)$$

Here, $K' = K(1-k_2T)$.

As it will be clear, by such an operation, the response of the helicopter is changed completely into the one shown when K is changed into K' (T is invariant).

The control mechanism according to the present invention may be provided in a control system which controls the actuator of the cyclic pitch control mechanism.

Figure 2:
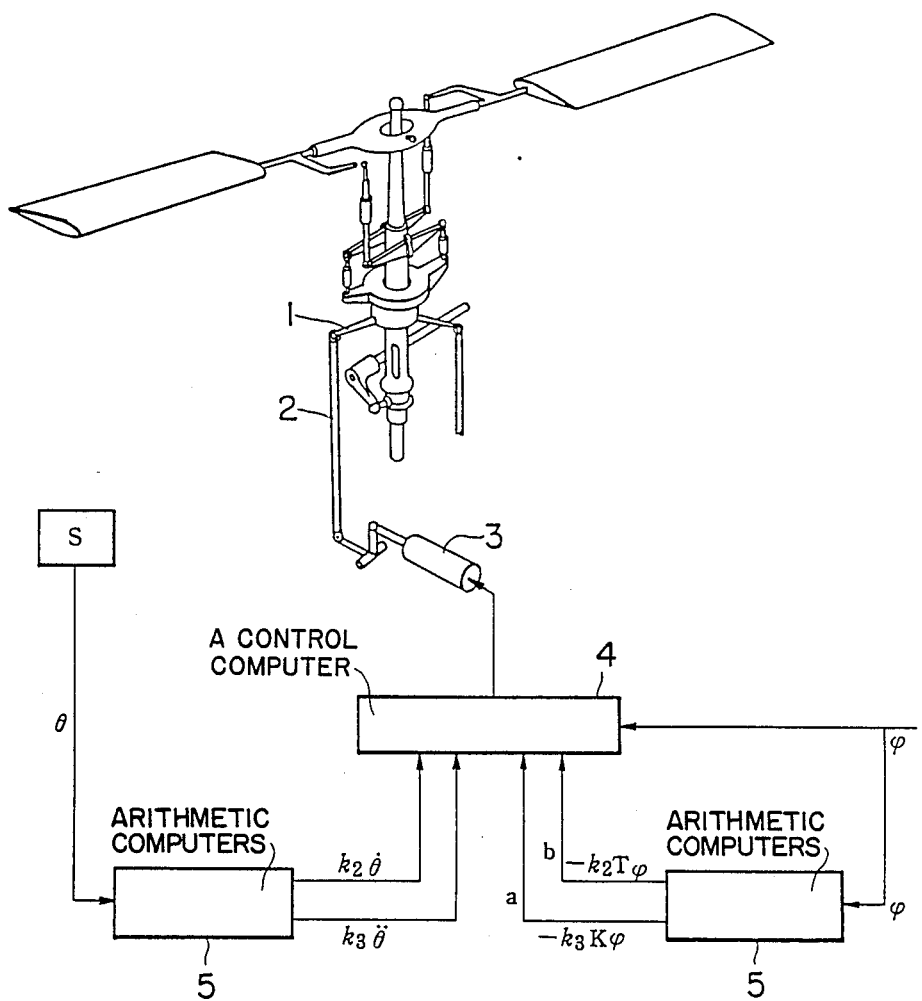
FIG. 2 is a view illustrating a control circuit according to the invention.

For example, as shown in FIG. 2, in the control mechanism wherein the actuator (3) actuating a rod (2) coupled to a lower swash (1) is controlled by a control computer (4), arithmetic computers (5) are added to the control computer (4) so as to calculate $k_3\ddot{\theta}$ proportional to the angular acceleration of the fuselage attitude angle $\theta$, and $k_2\dot{\theta}$ proportional to the angular velocity of the fuselage attitude angle $\theta$ on the basis of the attitude angle input from a sensor (S), and to calculate correction input $k_3K\Psi$ proportional the operating input $\Psi$, and correction input $-k_2T\Psi$ proportional to the operating input $\Psi$ on the basis of the cyclic pitch control input signal of the pilot, and by a desired control mode, to perform the cyclic pitch control by each following signal through the control computer (4), $$\Psi, k_3\ddot{\theta},$$
$$\Psi, k_3\ddot{\theta}, -k_3K\Psi,$$
$$\Psi, k_2\dot{\theta}, -k_2T\Psi,$$
$$\Psi, k_3\ddot{\theta}, k_2\dot{\theta},$$
$$\Psi, k_3\ddot{\theta}, k_2\dot{\theta}, -k_3K\Psi$$
$$\Psi, k_3\ddot{\theta}, k_2\dot{\theta}, -k_2T\Psi$$
$$\Psi, k_3\ddot{\theta}, k_2\dot{\theta}, -k_3K\Psi, -k_2T\Psi$$

Also, values other than the above values may be suitably selected as the correction input proportional to the operating input $\Psi$.

In the present invention, when providing separately from the actuator control system of the cyclic pitch control mechanism, as a control system for controlling the actuator of the cyclic pitch control mechanism by a signal proportional to the angular acceleration of the fuselage attitude angle $\theta$, various configurations can be applied such as obtaining the angular acceleration from the angular velocity gained by a rategyro, or inputting a signal gained by a known angular acceleration sensor to a desired actuator controller.

Also, as the control system for controlling the actuator of the cyclic pitch control mechanism by the signal $k_2\dot{\theta}$ proportional to the angular velocity of the fuselage attitude angle $\theta$ and the correction signal $-k_2T\Psi$ proportional to the cyclic pitch control input $\Psi$, the conventional SAS, etc. may be utilized to control by calculating and inputting only the correction signal.

Embodiment (2)

Now, the cyclic pitch control mechanism whereby a fully automatically controlled hovering can be accomplished without producing vibration in the attitude angle control response will be described.

Eliminating $\sigma$ from Equations (7) and (5) gives Equation (16) as the equation corresponding to Equation (6), $$\ddot{\theta} + T(1-k_3K)\dot{\theta} + K(1-k_2T)\theta = KT\Psi \quad (16)$$

In this analysis, when comparing the aforementioned Equation (6) and Equation (16), the fuselage attitude angle response relative to the operating input $\Psi$ of the cyclic pitch control is, if limited to $\Psi$, naturally the one shown by the fuselage having the rotor damping and control power value of T and K. But when $k_2\dot{\theta}$ and $k_3\ddot{\theta}$ are input in addition to $\Psi$, it can be seen that $\theta$ is changed completely and the same response as the one shown by the fuselage having the rotor damping and power control value different from T and K is exhibited.

Meanwhile, for the purpose of automatic control, if the input (proportional constant $k_1$) proportional to the fuselage attitude angle is input, the equation corresponding to Equation (4) gives Equation (17) and that corresponding to Equation (6) gives Equation (18), $$\sigma = T(\theta + \psi + k_3\theta + k_2\theta + k_1\theta - \sigma) \qquad (17)$$

$$\theta + T(1-k_3K)\theta + (1-k_2T)K\theta - k_1TK\theta = KT\psi \qquad (18)$$

General solution of Equation (18) is given by, $$\theta = A_1 e^{\Lambda_1 t} + A_2 e^{\Lambda_2 t} + A_3 e^{\Lambda_3 t} + \psi/-k_1 \qquad (19)$$

Here, $A_1, A_2, A_3$ = arbitrary constant.

$\Lambda_1, \Lambda_2, \Lambda_3$ are roots of cubic equation $$\Lambda^3 + T(1-k_3K)\Lambda^2 + K(1-K(1-k_2T)\Lambda - k_1TK = 0 \qquad (20)$$

As it will be clear from Equation (19), the fuselage is shown to be converged rapidly to the desired final attitude angle $\psi/-k_1$ without producing any vibration, relative to the operating input $\Psi$ of the cyclic pitch control lever of the pilot.

In this case, however, it is limited to the case where discriminant of Equation (20) is negative, the response of $\theta$ is non-vibratory, and all three values of $\Lambda_1, \Lambda_2, \Lambda_3$ are negatives with large absolute values.

Also, when value $k_1$ showing the accuracy of automatic control is large enough, value $\psi/-k_1$ is almost zero and irrespective of $\psi$, the fuselage attitude angle $\theta$ becomes zero, or the hovering attitude is retained.

Moreover, by the active control of the present invention, since the action of gust is same as that by the operating input $\psi$ of the operating lever given by the pilot, under any gust of wind, the fuselage is always maintained hovering without any countermeasure taken by the pilot, thus the automatic control at hovering, which was difficult hitherto, is made possible.

The automatic control is made possible, as described hereinbefore, only when the discriminant of Equation (20) is negative and the response of $\theta$ is non-vibratory, and all three values of $\lambda_1, \lambda_2, \lambda_3$ are negatives with large absolute values.

This is not obtained if the inherent rotor damping and control power value of the helicopter are fixed, but is obtained only when these two values are changed into the desired specific values in a very narrow range in response to the desired flight conditions by the active control of the present invention.

The active control of the present invention ensures the same automatic control in any control, besides the automatic hovering control described heretofore.

For example, inputting $k_1(\theta - \theta_o)$ in lieu of $k_1\theta$ to Equation (17), the fuselage attitude angle always retains the assumed attitude angle $\theta_0$ input by the pilot under any external turbulence.

The active control mechanism of the present invention may be provided in the control system controlling the actuator of the cyclic pitch control mechanism.

Figure 3:
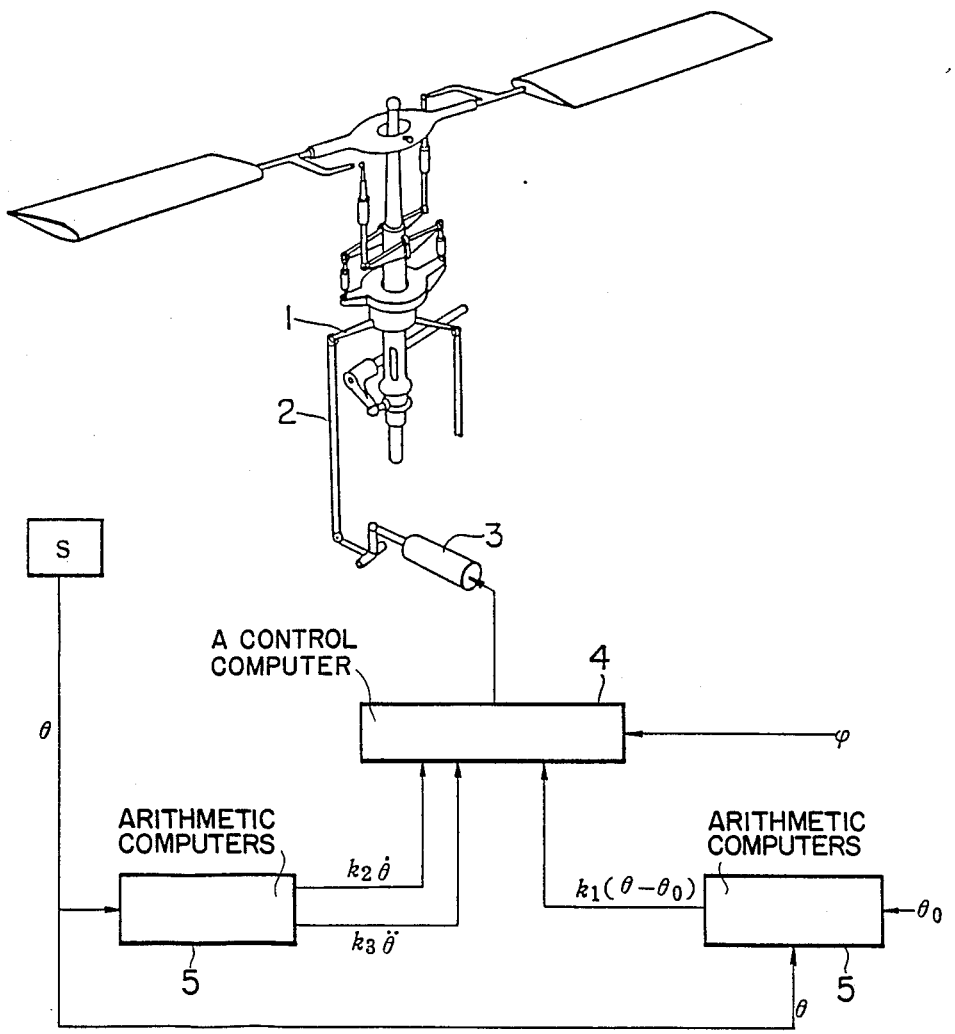
FIG. 3 is a view illustrating another control circuit according to the invention.

For example, as shown in FIG. 3, in the control mechanism wherein the actuator (3) actuating a rod (2) coupled to a lower swash (1) is controlled by a control computer (4), arithmetic computers (5) are added to the control computer (4) so as to calculate $k_3\theta$ (proportional to the angular acceleration of the fuselage attitude angle $\theta$) and $k_2\theta$ (proportional to the angular velocity of the fuselage attitude angle $\theta$) on the basis of the attitude angle $\theta$ input from a sensor (S), to compare the attitude angle $\theta$ and the assumed attitude angle $\theta_0$ and calculate $k_1(\theta - \theta_o)$ on the basis of the assumed attitude angle $\theta_0$ input from the sensor (S), and to perform the cyclic pitch control through the control computer (4) with each of above signals or $$\psi, k_3\theta, k_2\theta, k_1(\theta - \theta_o)$$

besides the cyclic pitch control input $\Psi$ signal of the pilot.

Embodiment 3

As described hereinbefore, a latest control system of a helicopter is mostly integrated with an automatic control mechanism into a combination with many kinds of inputs complicated mechanical and electrical circuits, resulting in such difficulties as securing the stability of the aircraft.

However, it is a synthetic transmitting function indicating the aircraft attitude angle $\theta$ relative to the cyclic pitch control input $\Psi$ added to a cyclic pitch lever of a pilot, which stabilizes the aircraft.

Since the coefficient of this function becomes rotor damping and control power function, in addition to the cyclic pitch control input $\Psi$ signal of the pilot, by adding $k_3\theta$ (proportional to the angular acceleration), and $k_2\theta$ (proportional to the angular velocity of the aircraft attitude angle $\theta$) to control the cyclic pitch control mechanism, rotor damping and control power can be brought to their optimum values, and thus the excellent stability of the aircraft can be secured.

More specifically, as shown in FIG. 2, in a control mechanism controlling the actuator (3) which actuates the rod (2) coupled to the lower swash (1) by the control computer (4), it may be constructed to control the cyclic pitch through the control computer (4) by removing the arithmetic computer (5) shown, and using only the control computer (4) to calculate $k_3\theta$ (proportional to the angular acceleration and $k_2\theta$ (proportional to the angular velocity of the aircraft attitude angle $\theta$) on the basis of attitude angle $\theta$ input from the sensor (S), and adding them to the cyclic pitch control input $\Psi$ signal input of the pilot. Thus the rotor damping and control power can be brought to their optimum values with simple construction and the excellent stability can be secured.

In each of above-mentioned embodiments, though only the case using one rotor has been described, it is to be understood that when using a plurality of rotors, by adding values of respective rotors, the same effect as each embodiment can be realized.

EXAMPLES

A real aircraft of 19,000 gross lbs. was utilized as a helicopter to obtain the time required to arrive at the desired attitude angle ($\theta_f = 4°$) when steering to change the attitude angle at the forward flight velocity of 120 knots (moment of steering was counted as 0 second).

At this time, two types of cyclic pitch control were performed, the one is by the conventional SAS (full line) and the other is by the control mechanism of the present invention (broken line).

Furthermore, for the purpose of comparison, in controlling the cyclic pitch with the control mechanism of the present invention, the cyclic pitch control was performed by the computer simulation when $k_3\theta$ (proportional to the angular acceleration of the fuselage attitude angle $\theta$) is 0 (one dot chain line). The result is shown in the step steering diagrams of FIG. 4.

Figure 4:
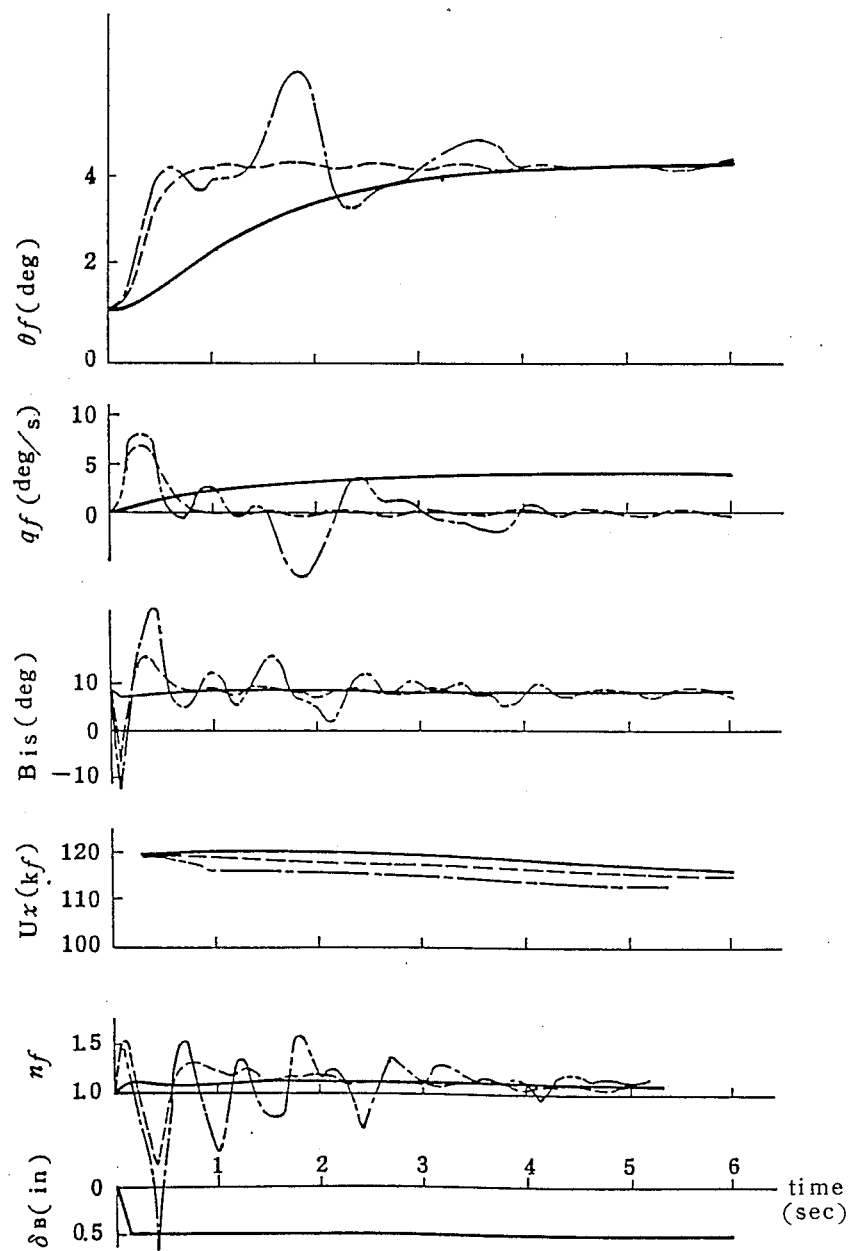
FIG. 4 is a graph showing step steering of a helicopter in the embodiment of the invention.

As it will be apparent from FIG. 4, it is to be understood that the present invention is very responsive as it takes only 0.5 to 1.0. second against 4 to 5 second required for the conventional SAS.

Also, in the case of the comparative sample, a vibration curve is so awful that the control is hardly possible, showing how important the angular acceleration input of the fuselage attitude angle $\theta$ is in the cyclic pitch control.

What is claimed is:

1. In a cyclic pitch control mechanism of a helicopter, an active control mechanism having a lower swash plate, comprising:
   an actuator of the control mechanism;
   means for providing a cyclic pitch control signal input;
   means for providing a first signal proportional to the angular acceleration of an attitude angle $\theta$ of the helicopter;
   means for providing a second signal compensatory to said first signal and proportional to a cyclic pitch control signal input $\Psi$ of a pilot;
   means for providing a third signal of the cyclic pitch control signal input $\Psi$ of a pilot; and
   said means for providing a cyclic pitch control signal input being responsive to said first, second and third signals for controlling said actuator and swash plate.

2. In a cyclic pitch control mechanism of a helicopter, an active control mechanism having a lower swash plate, comprising:
   an actuator of the control mechanism;
   means for providing a cyclic pitch control signal input $\Psi$;
   means for providing a first signal proportional to the angular velocity of an attitude angle $\theta$ of the helicopter;
   means for providing a second signal compensatory to said first signal and proportional to a cyclic pitch control signal input $\Psi$ of a pilot;
   means for providing a third signal of the cyclic pitch control signal input $\Psi$ of a pilot; and
   said means for providing a cyclic pitch control signal input being responsive to said first, second and third signals for providing a control signal for controlling said swash plate and said actuator.

3. In a cyclic pitch control mechanism of a helicopter, an active control mechanism having a lower swash plate, comprising:
   an actuator of the control mechanism;
   means for providing a cyclic pitch control signal input $\Psi$;
   means for providing first two signals proportional to the angular velocity of an attitude angle $\theta$ of the helicopter and proportional to the angular acceleration of the attitude angle $\theta$;
   means for providing second two signals compensatory to the angular velocity signal and angular acceleration signal and both proportional to a cyclic pitch control signal input $\Psi$ of a pilot
   means for providing a third signal of the cyclic pitch control input $\Psi$ of a pilot; and
   said means for providing a cyclic pitch control signal input being responsive to said first two signals, second two signals and said third signal for controlling said actuator and swash plate.

4. In a cyclic pitch control mechanism of a helicopter, an active control mechanism of the helicopter having a lower swash plate, comprising:
   an actuator of the control mechanism;
   means for providing a cyclic pitch control signal input $\Psi$;
   means for providing first two signals proportional to the angular velocity of the attitude angle $\theta$ of the helicopter and proportional to the angular acceleration of the attitude angle $\theta$;
   means for providing a second signal proportional to the difference between the attitude angle $\theta$ and an assumed attitude angle $\theta_0$;
   means for providing a third signal of the cyclic pitch control signal input $\Psi$ of a pilot; and
   said means for providing a cyclic pitch control signal input being responsive to said first two signals, said second signal and said third signal for controlling said actuator and swash plate.

5. In a cyclic pitch control mechanism of a helicopter, an active control mechanism of the helicopter and having, a lower swash plate, comprising:
   means for providing an attitude signal $\theta$ representing the attitude angle of the helicopter;
   first processing means responsive to said attitude signal for generating a signal $k_2\theta$ proportional to the angular velocity of said attitude angle and a signal $k_3\theta$ proportional to the angular acceleration of said attitude angle;
   second processing means responsive to the cyclic pitch control signal input $\Psi$ from the pilot of the helicopter for generating a correction signal $-k_4T\Psi$ and a correction signal $-k_5K\Psi$, where T is defined as the reciprocal number of rotor damping, K is defined as the control power value divided by the value moment of inertia around the center of gravity of the fuselage and $k_2$, $k_3$, $k_4$ and $k_5$ are constants;
   a control computer responsive to signals $k_2\theta$ and $k_3\theta$ and correction signals $-k_4T\Psi$ and $-k_5K\Psi$ and the cyclic pitch control signal input $\Psi$ from the pilot for generating a control signal; and
   actuator means responsive to said control signal for controlling said lower swash plate.

6. In a cyclic pitch control mechanism of a helicopter, an active control mechanism of the helicopter and having, a lower swash plate, comprising:
   means for providing an attitude signal $\theta$ representing the attitude angle of the helicopter;
   first processing means responsive to said attitude signal for producing a signal $k_2\theta$ proportional to the angular velocity of said attitude angle a signal $k_3\theta$ proportional to the angular acceleration of said attitude angle, where $k_2$ and $k_3$ are constants;
   second processing means responsive to said attitude angle and an assumed attitude angle $\theta_o$ for producing a signal $k_1(\theta-\theta_o)$;
   a control computer responsive to said signals $k_2\theta$ and $k_3\theta$ and a cyclic pitch control signal input from the pilot of the helicopter and said signal $k_1(\theta-\theta_o)$ for generating a control signal, where $k_1$ is a constant; and
   actuator means responsive to said control signal for controlling said lower swash plate.

* * * * *